United States Patent [19]
Aiso

[11] Patent Number: 6,055,353
[45] Date of Patent: Apr. 25, 2000

[54] OPTICAL FIBER FOR OPTICAL AMPLIFICATION AND OPTICAL AMPLIFIER USING THE OPTICAL FIBER

[75] Inventor: Keiichi Aiso, Ichihara, Japan

[73] Assignee: The Furukawa Electric Co., Ltd., Tokyo, Japan

[21] Appl. No.: 09/086,465

[22] Filed: May 29, 1998

[30] Foreign Application Priority Data

Jun. 5, 1997 [JP] Japan ................................. 9-148333

[51] Int. Cl.⁷ ...................................................... G02B 6/02
[52] U.S. Cl. ............................................. 385/123; 385/124
[58] Field of Search ....................................... 385/123–128

[56] References Cited

U.S. PATENT DOCUMENTS 5,838,868  11/1998  Krol et al. ............................... 385/127
5,894,537   4/1999  Berkey et al. ........................... 385/123

FOREIGN PATENT DOCUMENTS 5-142543  5/1993  Japan ........................... C03B 37/012

*Primary Examiner*—Phan T. H. Palmer
*Attorney, Agent, or Firm*—Lacasse & Associates; Randy W. Lacasse

[57] ABSTRACT

The present invention provides an optical fiber for optical amplification used for an optical transmission system, for which the chromatic dispersion is controlled, and an optical amplifier in which the optical fiber for optical amplification is employed. The optical fiber according to the invention is such that the cladding has a lower refractive index than the core and is disposed so as to surround the core having a higher refractive index than that of the cladding, wherein the refractive index difference Δ of the core with respect to the abovementioned cladding is from 0.4% to 1.9% and the diameter of the abovementioned core is from 4.2 to 5.0 μm.

4 Claims, 3 Drawing Sheets

W-shaped refractive index profile

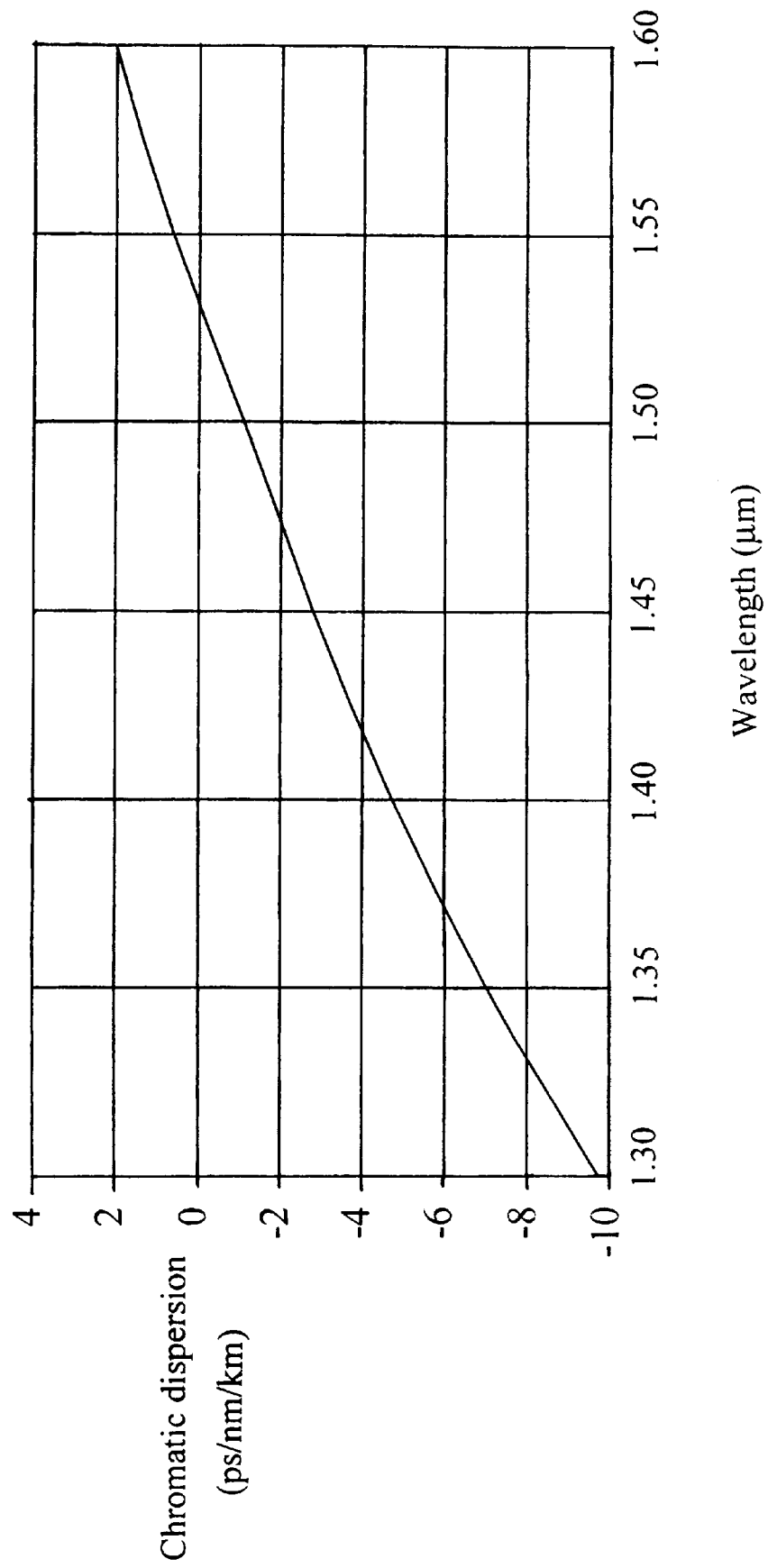

Segment-core shaped refractive index profile

Dual-core shaped refractive index profile

OPTICAL FIBER FOR OPTICAL AMPLIFICATION AND OPTICAL AMPLIFIER USING THE OPTICAL FIBER

FIELD OF THE INVENTION

The present invention relates to optical fibers for optical amplification used in a field of optical transmission systems, etc., and an optical amplifier in which the optical fibers are adopted.

BACKGROUND OF THE INVENTION

By development of optical fibers for optical amplification, in which an activation substance for optical amplification, for example, a rare-earth element is doped to the core, amplification was to made possible without converting optical signals to electrical signals. Optical fibers for optical amplification used for optical amplifiers in a usual optical transmission system are used at a length from several meters to several hundreds of meters, wherein in comparison with optical fibers used as optical transmission line, their usage length is short. Therefore, in conventional transmission systems, it has been considered that influences which chromatic dispersion of optical fibers for optical amplification gives to signal distortion are disregarded. Therefore, no special attention was paid to the chromatic dispersion characteristics in optical fibers for optical amplification; profile design (design of refractive index profile) has been carried out, highly considering the improvement of the amplification characteristics.

Generally in order to improve the characteristics, it is considered that it is effective to increase the relative refractive index difference $\Delta$ of a core of optical fibers for optical amplification with respect to cladding and make the core diameter small. This results from the fact that the confinement effect of light is increased by increasing the relative refractive index difference $\Delta$ of a core with respect to cladding to cause the pump power density (pump power) in an optical fiber for optical amplification to be enhanced, and a favorable population inversion is formed all over the area to which an activation substance for optical amplification is doped, by concentratedly causing the activation substance to exist at a higher place of pump power density while making the core diameter small, thereby improving the amplification characteristics (amplification efficiency).

As an example of a profile of optical fibers for optical amplification, which is designed in view of improvement of the amplification characteristics there is available a stepped type (which may be called matched type). Generally, optical fibers for optical amplification are formed of a silica ($SiO_2$) glass, (pure silica) based core, to which germanium is highly doped, and silica glass based cladding to which fluorine is highly doped. The relative refractive index difference $\Delta$ of the core with respect to the clad is 2.0% or so. The core diameter of the abovementioned optical fibers for optical amplification is about 2.7 $\mu$m and the outer diameter of the fibers is 125 $\mu$m. Furthermore erbium which is one of the activation substances for optical amplification and aluminum which averages the wavelength dependency of amplification gain, are doped to the core.

OBJECTS AND SUMMARY OF THE INVENTION

The use of high bit rate transmission in an optical fiber transmission line has been advancing by development of recent optical transmission networks. In line therewith, a signal distortion due to chromatic dispersion becomes a significant problem. It is now, more than ever necessary to more precisely control the chromatic dispersion in the entirety of an optical fiber transmission line. In order to solve this problem, it is necessary that the signal distortion in an optical amplifier itself, which has conventionally been considered disregardable, that is, signal distortion due to optical fibers for optical amplification is controlled. Therefore, it is desired that optical fibers for optical amplification are developed with the aim that the amplification characteristics are improved and simultaneously no signal distortion is produced by controlling the chromatic dispersion, not aiming at improvement of only the amplification characteristics as in conventional cases.

In view of the abovementioned problems, it is therefore an object of the invention to achieve a high bit rate transmission by controlling the dispersion characteristics of optical fibers for optical amplification and suppressing the signal distortion due to the wavelength dispersion of the optical fibers for optical amplification.

Optical fibers for optical amplification according to the first aspect of the invention are characterized in that they are composed of at least a silica ($SiO_2$) glass based core to which an activation substance for optical amplification is doped, and silica ($SiO_2$) glass based cladding outside the core, and the wavelength at which the dispersion value of optical fibers for optical amplification becomes zero (called zero dispersion wavelength) is included in an amplification wavelength band of the abovementioned optical fibers for optical amplification.

Optical fibers for optical amplification according to the second aspect of the invention are characterized in that they are composed of at least silica ($SiO_2$) glass based core to which an activation substance for optical amplification is doped, and silica ($SiO_2$) glass based cladding outside the core, the wavelength at which the dispersion value of optical fibers for optical amplification becomes zero (called zero dispersion wavelength) is included in an amplification wavelength band of the abovementioned optical fibers for optical amplification, and the relative refractive index difference $\Delta$ of a core with respect to the above mentioned cladding is from 0.4% to 1.9% and the diameter of the abovementioned core is from 4.2 $\mu$m to 5.0 $\mu$m.

According to the invention, by the zero dispersion wavelength of optical fibers for optical amplification being included in the amplification wavelength band of the abovementioned fibers for optical amplification, it is possible to control the chromatic dispersion at the amplification wavelength band so as to be minimized to such a degree that the dispersion hardly influences the transmission characteristics. Therefore, in an optical transmission system employing optical fibers for optical amplification, the signal distortion resulting from wavelength dispersion of optical fibers for optical amplification can be suppressed, and a high bit rate transmission can be achieved by the optical fiber transmission.

BRIEF DESCRIPTION OF THE DRAWINGS

These and other objects of the advantages of the present invention will become more apparent and more readily appreciated from the following detailed description of the exemplary embodiments of the invention, taken in conjunction with the accompanying drawings, in which:

FIG. 2 is a view showing the chromatic dispersion characteristics of optical fibers for optical amplification showing an embodiment of the invention, and FIGS. 3A, 3B, and 3C are explanatory views showing profile examples of the other refractive index of optical fibers for optical amplification, wherein FIG. 3A is a view of W-shaped refractive index profile, FIG. 3B is a view of segment core shaped profile, and FIG. 3C is a view of dual-core shaped profile.

DETAILED DESCRIPTION

Hereinafter, a description is given of a preferred embodiment of the invention with reference to the drawings.

Figure 1:
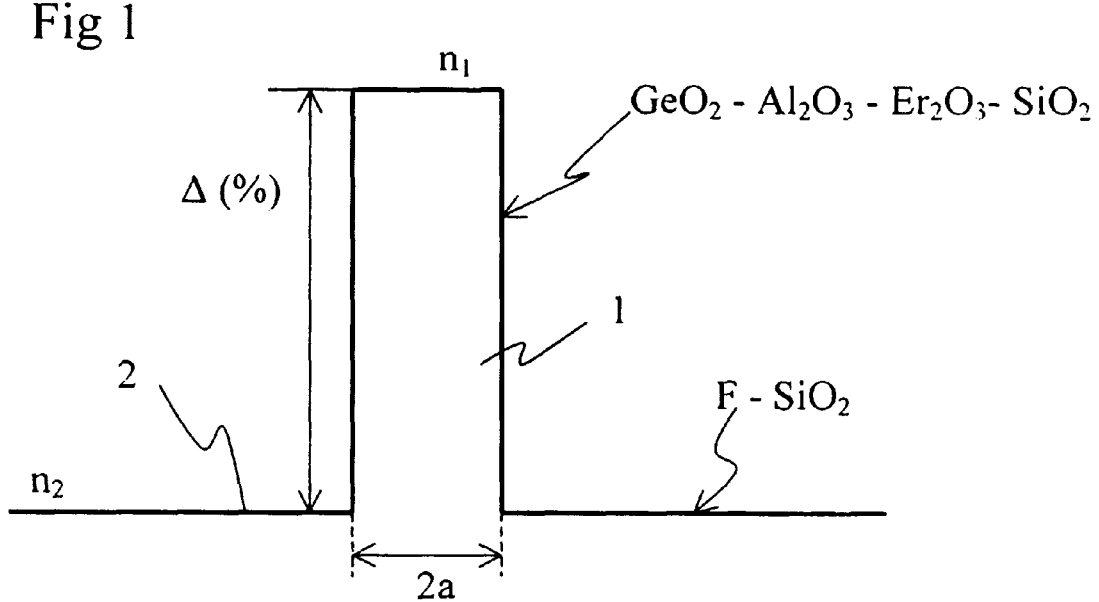
FIG. 1 is a view showing a refractive index profile of optical fibers for optical amplification showing an embodiment of the invention.
Figure 3A:
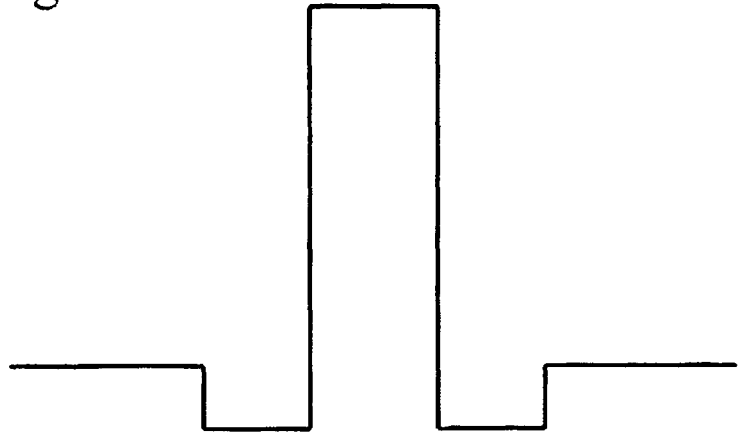
Figure 3B:
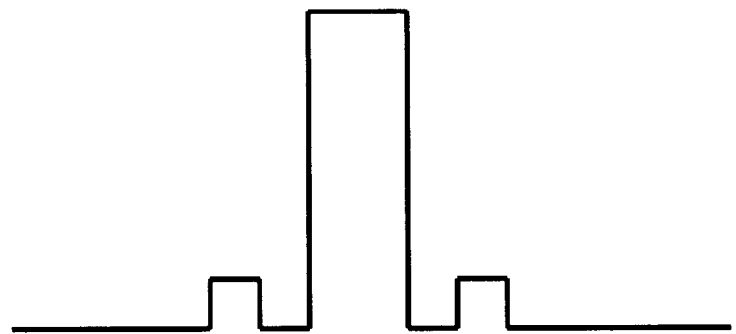
Figure 3C:
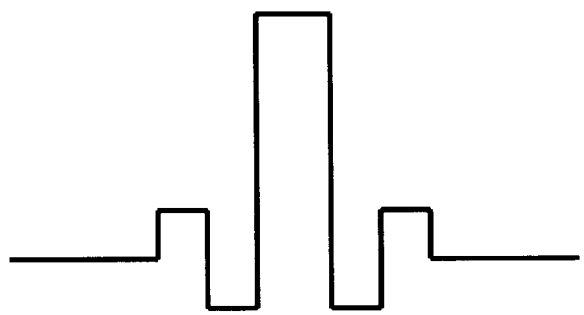

A refractive index profile of one preferred embodiment of optical fibers for amplification according to the invention is shown in FIG. 1. As profiles of the refractive indexes of optical fibers for optical amplification, there are many variations such as W type shown in FIG. 3A, segment core type shown in FIG. 3B and dual core type shown in FIG. 3C. However in this embodiment, a step type (called matched type) refractive index profile shown in FIG. 1 is employed which is simple in construction and easy in design and control of the refractive index structure.

In the refractive index structure shown in FIG. 1, in a case where the refractive index of core 1 is $n_1$ and the refractive index of cladding 2 is $n_2$, the relative refractive index difference $\Delta$ of the core 1 with respect to cladding 2 is defined by the following equation (1).

$$\Delta = \{(n_1^2 - n_2^2)/2n_1^2\} \times 100 \quad (1)$$

In the refractive index structure of optical fibers for optical amplification of the step profile shown in FIG. 1, the refractive index profile presents a step type while cladding 2 having a lower refractive index than the core 1 is disposed so as to surround the core 1 having a higher refractive index. The abovementioned core 1 is formed of germanium ($GeO_2$) doped silica glass (Pure silica, $SiO_2$) and cladding 2 is formed of fluorine (F) doped silica glass ($SiO_2$).

Erbium ($Er_2O_3$) is doped to the core 1 of the abovementioned optical fibers for optical amplification as an activation substance for optical amplification, and aluminium ($Al_2O_3$) is also doped in order to average the wavelength dependency of amplification gain. The amount of doping of these substances is small, which does not influence the refractive index profile of optical fibers for optical amplification. Furthermore, the outer diameter of optical fibers for optical amplification is 125 $\mu$m in order to obtain the easiness of connection with optical fibers (outer diameter is 125 $\mu$m) which constitute the other optical transmission line.

In the preferred embodiment, with optical fibers for optical amplification being constructed so as to suppress the chromatic dispersion characteristics which have not conventionally been taken into consideration, the relative refractive index difference $\Delta$ of the core 1 with respect to the cladding 2 is set to be from 0.4% to 1.9% and the core diameter 2$a$ is set to be from 4.2 $\mu$m to 5.0 $\mu$m. The chromatic dispersion is the sum of material dispersion (determined by a substance constituting the core and cladding) inherent to the waveguide structure of optical fibers). Taking this point into consideration, the inventor adjusts the parameters of the waveguide dispersion and achieves optical fibers for optical amplification, which do not produce signal distortion by canceling the material dispersion in the amplification wavelength band by the waveguide dispersion. By using an optical amplifier equipped with optical fibers for optical amplifier amplification, a high bit rate transmission is achieved in the optical fiber transmission.

Furthermore, Erbium which is a substance to activate the optical amplification is one of the rare-earth elements and it has been widely known that with erbium light whose wavelength is 1.45 to 1.65 $\mu$m can be amplified. Therefore, since the amplification wavelength band of optical fibers for optical amplification in the present embodiment is 1.45 to 1.65 $\mu$m, it is necessary that the zero dispersion wavelength of the optical fibers exists in the range from 1.45 to 1.65 $\mu$m.

Accordingly, the conditions have been taken into consideration through the following experimental examples.

As an example, optical fibers for optical amplification, especially, the abovementioned optical fibers for optical amplification in which the relative refractive index amplification difference $\Delta$ of the core with respect to the core diameter 2$a$ and cladding being structure parameters of the waveguide dispersion is adequately changed was prepared. The reason why attention was paid to the structure parameters is that changes or alteration of the structure parameters hardly influence the material dispersion but greatly influence the waveguide dispersion.

The zero dispersion wavelength, dispersion value at a wavelength 1.55 $\mu$m in the amplification wavelength band and cutoff wavelength were, respectively, measured with respect to the optical fibers for optical amplification prepared by the inventor. The results thereof are summarized in Table 1. Herein, the reason why the dispersion value at 1.55 $\mu$m was measured is based on an assumption that in an optical transmission system employing optical fibers for optical amplification according to the preferred embodiment, light whose wavelength is 1.55 $\mu$m is transmitted. Furthermore, samples No. 1 through 6 are the results in a case where the core diameter was changed with the relative refractive index difference fixed, and samples No. 7 through 12 are the results in a case where the relative refractive index difference $\Delta$ was changed with the core diameter fixed. Sample No. 3 and sample No. 9, hereafter referred to as 3(9) are fibers of the same structure.

TABLE I

| Sample No. | Relative refractive index difference $\Delta$ (%) | Core diameter ($\mu$m) | Zero dispersion wavelength ($\mu$m) | Dispersion value (ps/nm/km) | Cutoff wavelength ($\mu$m) |
|---|---|---|---|---|---|
| 1 | 1.2 | 4.0 | 1.73 | −6.90 | 1.17 |
| 2 | 1.2 | 4.2 | 1.64 | −3.80 | 1.23 |
| 3 | 1.2 | 4.4 | 1.54 | 0.40 | 1.26 |
| 4 | 1.2 | 4.8 | 1.47 | 3.60 | 1.40 |
| 5 | 1.2 | 5.0 | 1.45 | 5.40 | 1.46 |
| 6 | 1.2 | 5.1 | 1.43 | 6.30 | 1.49 |
| 7 | 0.2 | 4.4 | 1.36 | 17.30 | 0.52 |
| 8 | 0.4 | 4.4 | 1.51 | 3.50 | 0.73 |
| 9 | 1.2 | 4.4 | 1.54 | 0.40 | 1.26 |
| 10 | 1.6 | 4.4 | 1.52 | 1.23 | 1.49 |
| 11 | 1.9 | 4.4 | 1.48 | 2.74 | 1.62 |
| 12 | 2.2 | 4.4 | 1.44 | 4.00 | 1.76 |

As has been made clear from Table in cases where the relative refractive index difference $\Delta$ of optical fibers for optical amplification is from 0.4% to 1.9% and the abovementioned core diameter 2$a$ is from 4.2 $\mu$m to 5.0 $\mu$m (samples No 2 through 5, and samples number 8 through 11), the zero dispersion wavelength of optical fibers for optical amplification exists in the amplification wavelength band being 1.45 $\mu$m through 1.65 $\mu$m. Therefore, the dispersion value at a wavelength of 1.55 $\mu$m is suppressed to be ±5.5 ps/nm/km or less which is not substantially influenced in practical applications. Furthermore, since the cutoff wavelength of the abovementioned optical fibers for optical amplification does not exist in a greater wavelength area than the amplification wavelength band, that is, a greater area than 1.65 μm in any case, it is possible to compensate a single mode actuation.

FIG. 2 shows the chromatic dispersion characteristics of sample No. 3 (9). As has been made clear in FIG. 2, the optical fibers for optical amplification of No. 3 (9) has almost zero dispersion in the erbium absorption area (wavelength 1.53 μm band) and the chromatic dispersion characteristics in the amplification wavelength band (1.45 through 1.65 μm) were satisfactory.

Furthermore, an optical amplifier defining an optical system comprises an optical fiber for optical amplification of sample No.3(9), wherein the amplification characteristics was evaluated. When measuring the wavelength dependency of the optical output as one of the amplification characteristics, almost no wavelength dependency was recognized. There was no disadvantage in comparison with conventional optical fibers for optical amplification which have been developed, aiming at only the amplification characteristics. Furthermore, the conversion efficiency from pump light to single light in mere optical fibers for optical amplification in the preferred embodiment was very high at 85%, and such characteristics as been able to be employed in practical application could be obtained.

What is claimed is:

1. An optical fiber for optical amplification comprising: a silica ($SiO_2$) glass based core to which at least an activation substance for optical amplification is doped, and a silica ($SiO_2$) glass based cladding outside said core, wherein the core diameter and the relative refractive index amplification difference $\Delta$ of a core with respect to the cladding, which are structure parameters of the waveguide dispersion of an optical fiber for optical amplification, are adjusted in a direction for canceling the material dispersion, and the wavelength value at which the chromatic dispersion value of said optical fiber for optical amplification becomes zero is set in the amplification wavelength band of said optical fiber.

2. An optical fiber for optical amplification as set forth in claim 1, wherein the relative refractive index difference of said core with respect to the cladding is from 0.4% to 1.9%, and the diameter of the core is from 4.2 μm to 5.0 μm.

3. An optical amplifier comprising the optical fiber defined in claim 1.

4. An optical amplifier comprising the optical fiber defined in claim 2.

* * * * *